United States Patent
Le et al.

(10) Patent No.: US 11,709,937 B2
(45) Date of Patent: Jul. 25, 2023

(54) INACTIVATING BASIC BLOCKS OF PROGRAM CODE TO PREVENT CODE REUSE ATTACKS

(71) Applicant: International Business Machines Corporation, Armonk, NY (US)

(72) Inventors: Michael Vu Le, Danbury, CT (US); Hani Talal Jamjoom, Cos Cob, CT (US)

(73) Assignee: International Business Machines Corporation, Armonk, NY (US)

(*) Notice: Subject to any disclaimer, the term of this patent is extended or adjusted under 35 U.S.C. 154(b) by 209 days.

(21) Appl. No.: 17/411,974

(22) Filed: Aug. 25, 2021

(65) Prior Publication Data
US 2023/0069035 A1 Mar. 2, 2023

(51) Int. Cl.
*G06F 21/56* (2013.01)
*G06F 9/30* (2018.01)

(52) U.S. Cl.
CPC ........ *G06F 21/566* (2013.01); *G06F 9/30181* (2013.01); *G06F 2221/033* (2013.01)

(58) Field of Classification Search
CPC ............... G06F 21/566; G06F 9/30181; G06F 2221/033
USPC .......................................................... 726/22
See application file for complete search history.

(56) References Cited

U.S. PATENT DOCUMENTS

| | | | |
|---|---|---|---|
| 9,250,937 B1* | 2/2016 | Franz .................. | G06F 9/45516 |
| 9,336,370 B2* | 5/2016 | Chevallier-Mames ...................... G06F 21/14 | |
| 9,805,188 B2* | 10/2017 | Wesie ..................... | G06F 9/445 |
| 10,049,211 B1* | 8/2018 | Lukacs .................. | G06F 21/566 |
| 10,108,798 B1* | 10/2018 | Friedman .................. | G06F 8/52 |
| 10,356,107 B1* | 7/2019 | Kent .................... | H04L 63/1408 |
| 10,516,533 B2* | 12/2019 | Mannan ................ | H04L 9/3226 |
| 10,642,596 B2* | 5/2020 | Tanimoto .................. | G06F 8/65 |
| 10,885,184 B1* | 1/2021 | Schnidrig ............... | G06F 21/54 |
| 11,645,428 B1* | 5/2023 | Meinholz .............. | H04L 9/0618 713/190 |
| 2007/0180434 A1* | 8/2007 | Forin ...................... | G06F 8/447 717/136 |

(Continued)

OTHER PUBLICATIONS

"Gadget-2 Best Practices for Intel Cluster Ready," HPC Advisory Council, 2011, 3 pages.

(Continued)

*Primary Examiner* — Monjur Rahim
(74) *Attorney, Agent, or Firm* — Van Leeuwen & Van Leeuwen; Jeffrey S. LaBaw

(57) ABSTRACT

An approach is provided that, after receiving a request to execute a computer program, determines an active set of metadata that corresponds to the requested computer program and then loads basic blocks of the requested computer program into memory. One of the loaded basic blocks is a starting block of the requested computer program. The memory also stores basic blocks corresponding to some previously loaded computer programs. The approach also inactivates basic blocks that are currently stored in the memory, with the inactivated basic blocks being identified based on a comparison of the active set of metadata to the sets of metadata that corresponding to the basic blocks of previously loaded computer programs. After inactivating some basic blocks, the approach executes the starting block of the requested computer program.

20 Claims, 6 Drawing Sheets

(56) References Cited

U.S. PATENT DOCUMENTS

| | | | | |
|---|---|---|---|---|
| 2008/0162884 | A1* | 7/2008 | Kailas | G06F 9/3857 712/214 |
| 2013/0160121 | A1* | 6/2013 | Yazdani | G06F 21/54 726/23 |
| 2014/0082329 | A1* | 3/2014 | Ghose | G06F 9/3877 712/208 |
| 2015/0339480 | A1* | 11/2015 | Lutas | G06F 21/56 726/22 |
| 2016/0179546 | A1* | 6/2016 | Yamada | G06F 8/52 712/240 |
| 2016/0180115 | A1* | 6/2016 | Yamada | G06F 13/387 711/163 |
| 2016/0196427 | A1* | 7/2016 | Davidov | G06F 21/554 726/23 |
| 2017/0213039 | A1* | 7/2017 | Werner | G06F 12/145 |
| 2017/0344747 | A1* | 11/2017 | Baji-Gál | G06F 21/52 |
| 2018/0046585 | A1* | 2/2018 | Okhravi | G06F 12/023 |
| 2018/0082056 | A1* | 3/2018 | Farchi | G06F 21/554 |
| 2018/0225446 | A1* | 8/2018 | Liu | G06F 21/577 |
| 2018/0365573 | A1* | 12/2018 | Sultana | G06N 5/04 |
| 2019/0005230 | A1* | 1/2019 | Peleg | G06F 21/52 |
| 2019/0005231 | A1* | 1/2019 | Peleg | G06F 21/54 |
| 2019/0042730 | A1* | 2/2019 | Yamada | G06F 21/554 |
| 2019/0042760 | A1* | 2/2019 | Gutson | G06F 21/54 |
| 2019/0081983 | A1* | 3/2019 | Teal | H04L 63/0218 |
| 2019/0324732 | A1* | 10/2019 | Le | G06F 9/45516 |
| 2020/0065490 | A1* | 2/2020 | Shanmugavelayutham | G06F 21/566 |
| 2021/0247971 | A1* | 8/2021 | Le | G06F 11/3612 |
| 2022/0019657 | A1* | 1/2022 | Sethumadhavan | G06F 21/52 |

OTHER PUBLICATIONS

Anonymously, "System, Method and Apparatus for Constraining Deployment Options for a Software System to Remove Deployment-Specific Security Threats," IP.com, IPCOM000227921D, May 2013, 3 pages.

Anonymously, "Method for Protecting Code From Running in Unlicensed Environments," IP.com, IPCOM000237410D, Jun. 2014, 3 pages.

Anonymously, "Secure Build and Policy Updates," IP.com, IPCOM000263761D, Oct. 2020, 5 pages.

Liu et al., "Fabric: Building Open Distributed Systems Securely by Construction," Journal of Computer Security 0 (0) 1, IOS Press, vol. 25 (4-5), p. 367-426, Jul. 2017.

Neugschwandtner et al., "Runtime Integrity Checking for Exploit Mitigation on Embedded Devices," 9th International Conference on Trust & Trustworthy Computing, Vienna, Aug. 2016, 33 pages.

* cited by examiner

INACTIVATING BASIC BLOCKS OF PROGRAM CODE TO PREVENT CODE REUSE ATTACKS

BACKGROUND

Code-reuse attacks, also known as "return-oriented programming (ROP)" are computer security exploit techniques in which an attacker (e.g., malevolent user, "hacker," etc.) gains control of the call stack in order to re-route program control to execute carefully chosen instruction sequences that are already present in the computer system's memory, commonly referred to as "gadgets." Each gadget typically ends in a return instruction and is located in a subroutine within the existing program or shared library code. By chaining these gadgets together, the attacker can perform malevolent operations on the user's computer system even when the user's system has basic malevolent software defenses. These code reuse attacks rely on an abundant supply of instructions from the target application. A large mix of instruction types such as arithmetic, logical, memory operation, control transfer and privileged instructions, makes it possible for the attacker to form the necessary chains of instructions to carry out the attack. Traditional malevolent software defenses are often thwarted by these code reuse attacks since the code being used to attack the target system was legitimately loaded by the user or authorized processes.

SUMMARY

An approach is provided that, after receiving a request to execute a computer program, determines an active set of metadata that corresponds to the requested computer program and then loads basic blocks of the requested computer program into memory. One of the loaded basic blocks is a starting block of the requested computer program. The memory also stores basic blocks corresponding to some previously loaded computer programs. The approach also inactivates basic blocks that are currently stored in the memory, with the inactivated basic blocks being identified based on a comparison of the active set of metadata to the sets of metadata that corresponding to the basic blocks of previously loaded computer programs. After inactivating some basic blocks, the approach executes the starting block of the requested computer program.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
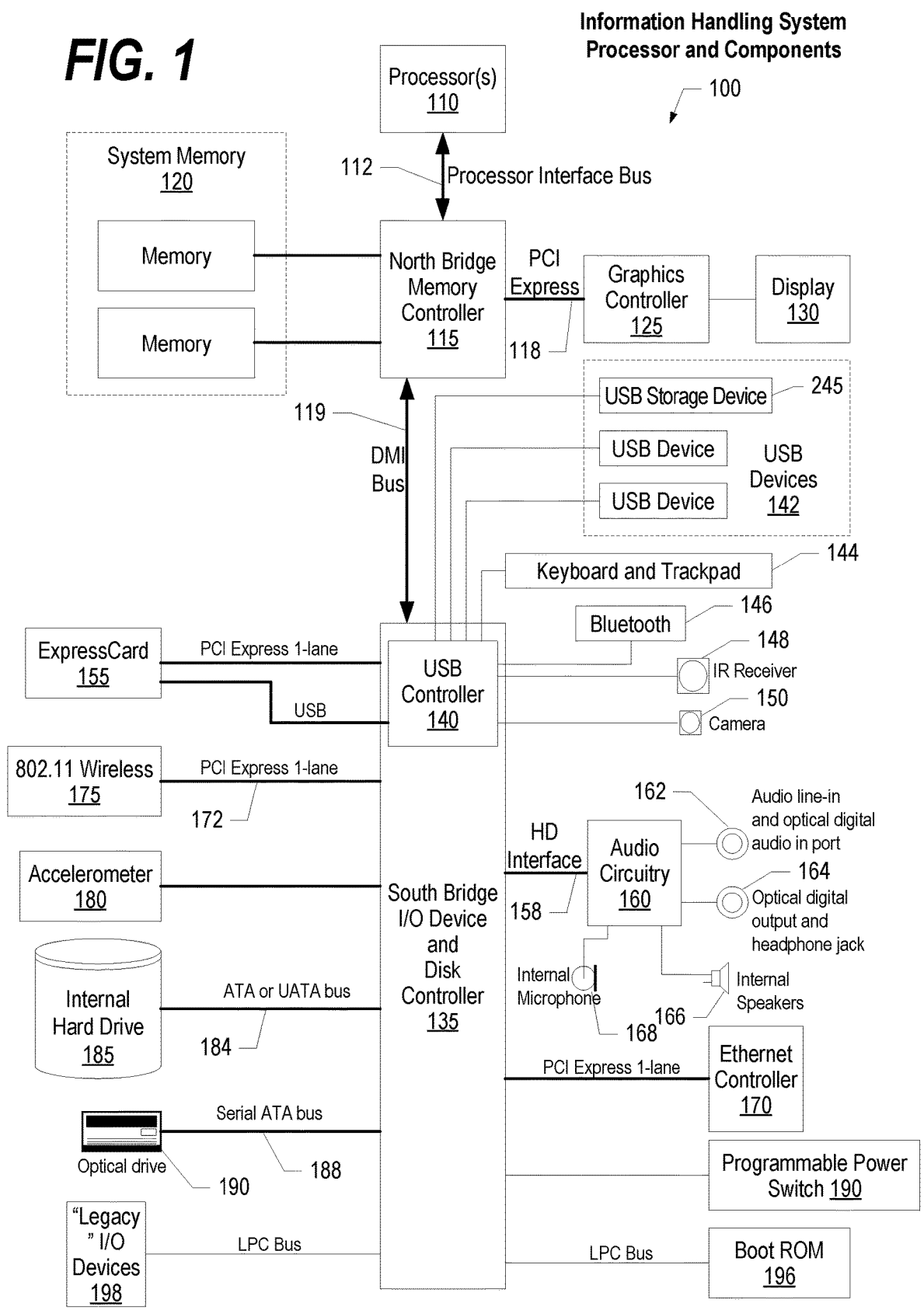
FIG. 1 is a block diagram of a data processing system in which the methods described herein can be implemented.

FIGS. 1-6 shows an approach that enforces a gadget class threshold in applications at runtime. Code reuse attacks rely on an abundant supply of instructions from the target application. A large mix of instruction types such as arithmetic, logical, memory operation, control transfer and privileged instructions, makes it possible for an attacker to form the necessary chains of instructions to carry out the attack. This approach provides a way to set and enforce a threshold on the amount and type of instructions loaded into memory without preventing correct execution of the application.

The approach monitors applications at runtime. If the number of gadget classes exceed a given threshold, the approach selects one or more gadget classes to remove and then removes all basic blocks associated with the selected gadget classes. When faulting in a basic block belonging to a new gadget class, the approach also determines the possible maliciousness of the code in the basic blocks by relying on existing security mechanisms such as CFI, runtime monitoring of execution flow, basic block boundary checks, stack shape, etc.

The approach is thus able to maintain a threshold on the number of available gadget classes in memory at any given time. This provides efficient security checking as it depends on gadget class eviction rate and/or churn rate. This provide a new application behavior metric, the gadget class churn rate, that can be used to detect malicious behavior (e.g., abnormal fetch pattern, etc.). This also provides new opportunities to sandbox execution, monitor, or delay execution in the case of suspicious behavior at the point of fetching basic blocks associated with new gadget class. As used herein, a "gadget" is a series of instructions included in a basic block that end in a control transfer instruction. A "gadget class" is a series of instructions that perform a type of computation such as arithmetic, logical, comparison, and control transfer. This "category" of information is stored as "metadata" corresponding to the various basic blocks.

In summary, the approach described herein provides a thin runtime agent that performs runtime enforcement of maintaining thresholds on the number of gadget classes, or categories, of code that are allowed to remain in memory at a given time. When the number of categories is exceeded, the approach identifies victim categories and removes the basic blocks corresponding to such victim categories from the memory.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
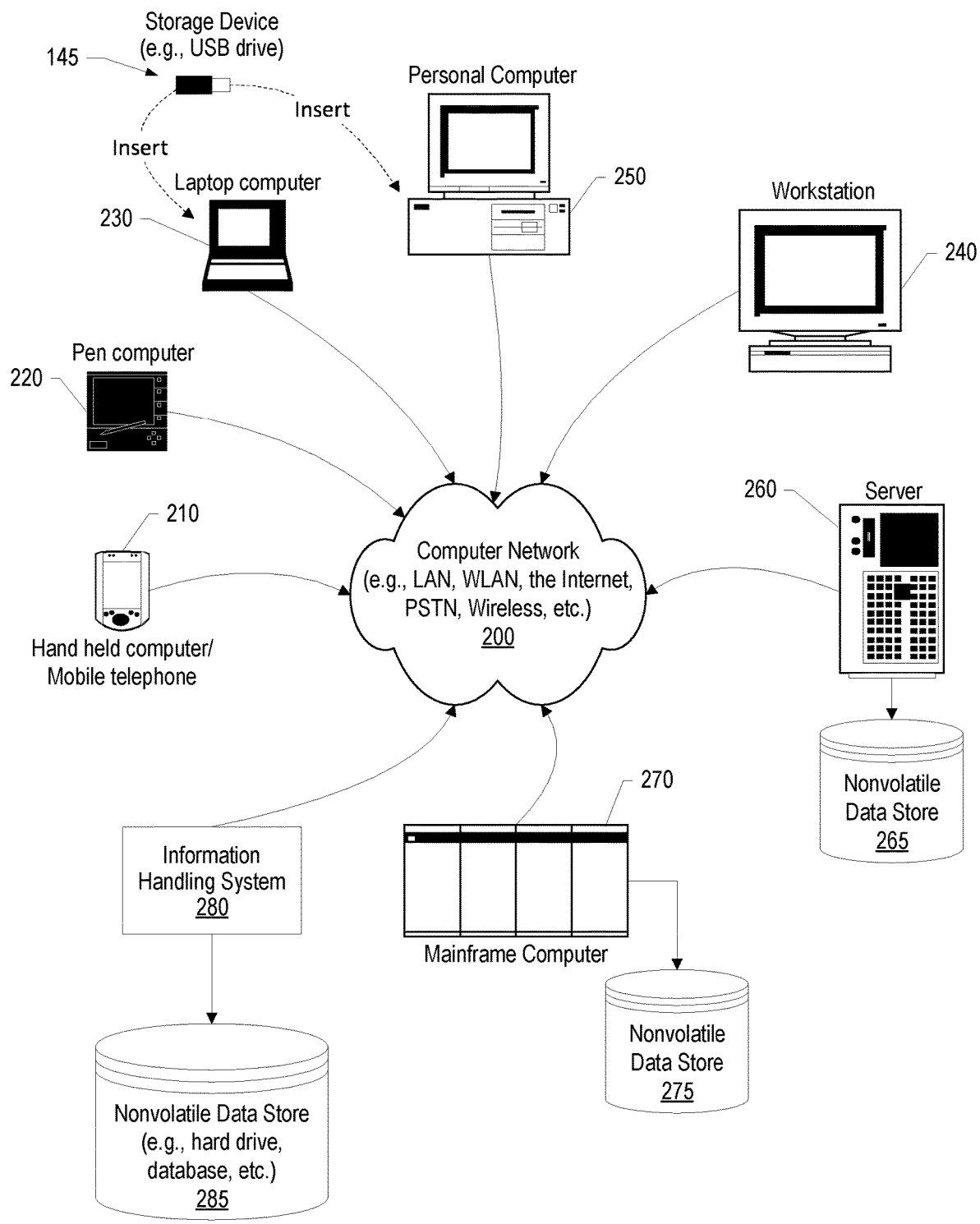
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
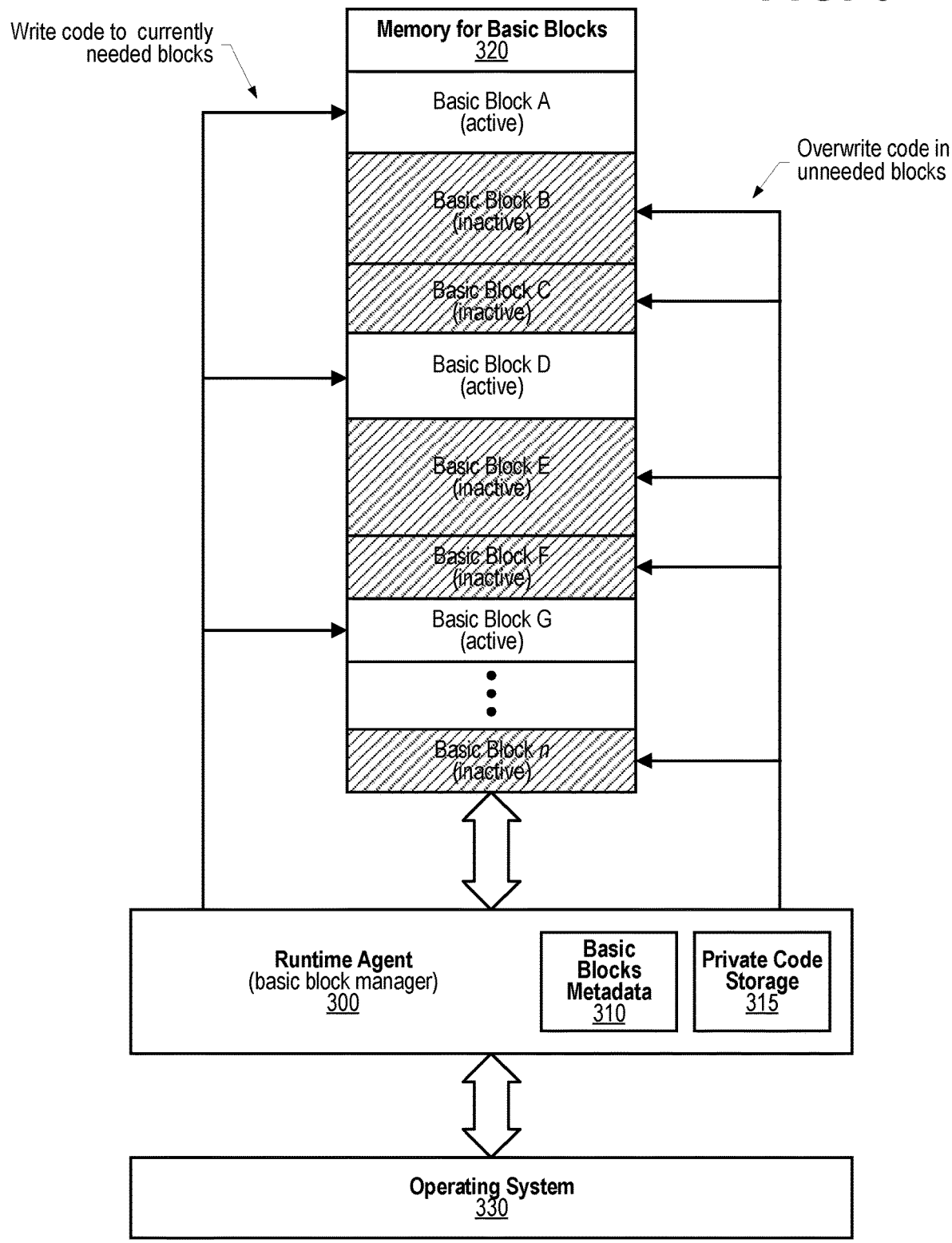
FIG. 3 is a diagram depicting a basic block manager acting as a runtime agent that overwrites code in unneeded code blocks to thwart malevolent code reuse attacks.

FIG. 3 is a diagram depicting a basic block manager acting as a runtime agent that overwrites code in unneeded code blocks to thwart malevolent code reuse attacks. Runtime agent 300 is the basic block manager that handles loading and removing basic blocks from memory 320 where basic blocks of instructions are loaded for instructions. In one embodiment, these basic blocks of instructions form "gadgets" which are series of instructions included in a basic block that end in a control transfer instruction. A "gadget class" is a series of instructions that perform a type of computation such as arithmetic, logical, comparison, and control transfer. This "category" of information is stored as "metadata" corresponding to the various basic blocks. This metadata is stored in memory area 310 with the metadata being maintained by the runtime agent.

When a basic block of instructions are loaded, the runtime agent identifies the various category or categories (e.g., "gadget classes," etc.) included in the basic block. Examples of the various categories, or gadget classes, might include arithmetic type, logical type, comparison type, control transfer type, and other types of computations that might be encoded in a basic block. The runtime agent determines which types of basic blocks to keep in memory and which types of basic blocks to remove from memory. This determination is based on a threshold used to control the number of types, or gadget classes, that are stored in memory at one time. When the threshold is exceeded, the runtime agent determines which basic blocks to inactivate from memory 320.

In one embodiment, when the runtime agent inactivates a basic block from memory, a set of trap code (instructions) are written to the memory area where the inactivated block resided. In one embodiment, the remainder of the memory area where the inactivated block resided is written over (e.g., writing zeros to all memory in the memory area except for the trap code, etc.). In a further embodiment, a copy of the inactivated code is stored in private code storage 315 that is accessible by the runtime agent and is inaccessible to any would be hackers or malevolent processes that might be trying to understand what code is included in the inactivated basic blocks.

The trap code is designed to call, or transfer control, to the runtime agent. This would occur when a running active basic block tries to call an inactivated basic block. The runtime agent, when called by the trap code, reloads the basic block by retrieving a copy of the inactivated basic block, such as from private code storage 315. The runtime agent then has operating system 330 execute the reloaded basic block.

Figure 4:
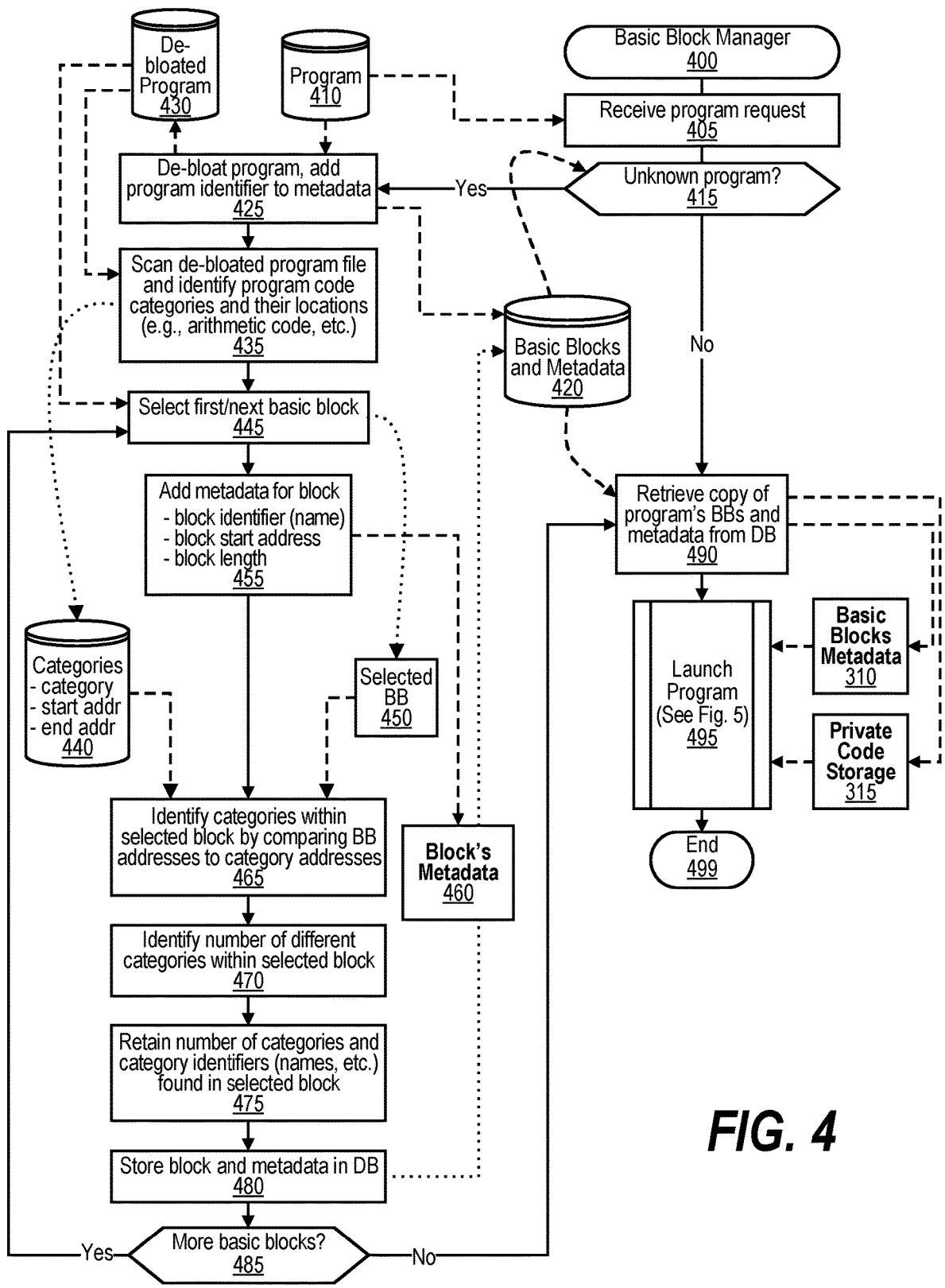
FIG. 4 is a flowchart showing steps taken by the basic block manager when it receives a program request.

FIG. 4 is a flowchart showing steps taken by the basic block manager when it receives a program request. FIG. 4 processing commences at 400 and shows the steps taken by a process that performs the basic block manager functions. At step 405, the process receives a program request. The request can be for a program previously encountered and managed by the basic block manager or for an "unknown" program not previously encountered by the basic block manager. The program is retrieved from data store 410.

The process determines as to whether the requested program is a program previously unknown to the basic block manager (decision 415). This determination is made by comparing the requested program to metadata already stored in metadata storage 420. If the requested program is for an unknown program, then decision 415 branches to the 'yes' branch to perform steps 425 through 499. On the other hand, if the program has previously been encountered by the basic block manager, then decision 415 branches to the 'no' branch to just perform a subset of the steps, steps 490 through 499.

Steps 425 through 485 are only performed when processing a previously unknown (unencountered) program. At step 425, the process de-bloats the program and adds a program identifier corresponding to the program to a set of metadata that is stored in data store 420. The de-bloated program file is stored in data store 430. At step 435, the process scans the de-bloated program file and identifies program code categories (gadget types, types, etc.) and their locations within the de-bloated block of program code. As previously mentioned, these types might be arithmetic, logical, comparison, control transfer, etc. The data resulting from the scan, such as the types (categories) of instructions in the de-bloated program file along with the starting and ending address of each basic block within the program file, is stored in data store 440.

At step 445, the process selects the first basic block from the de-bloated program file stored in data store 430. The selected basic block is stored in memory area 450 for further analysis. At step 455, the process adds metadata for the selected block to memory area 460. This metadata includes a basic block identifier (e.g., name, etc.), the basic block starting address, and the basic block length (or ending address).

At step 465, the process identifies instruction types (gadget types, categories, etc.) within the selected basic block stored in memory area 450 by comparing the basic block's addresses to the previously identified type (category) addresses that were stored in data store 440. At step 470, the process identifies the number of different types (e.g., categories, gadget types, etc.) within the selected basic block. At step 475, the process retains the number of instruction types and category identifiers (names, etc.) found in the selected basic block as metadata. At step 480, the process stores the de-bloated basic block and its corresponding metadata in data store 420.

The process determines whether there are more basic blocks within the de-bloated program file to process (decision 485). If there are more basic blocks to process, then decision 485 branches to the 'yes' branch which loops back to step 445 to select and process the next basic block from the de-bloated program file. This looping continues until all of the basic blocks have been selected and processed, at which point decision 485 branches to the 'no' branch exiting the loop. Control then passes to step 490 that is also performed for programs already known to the basic block manager.

Steps 490 through 499 are performed for programs that were previously unknown to the basic block manager as well as for programs that were already known to the basic block manager. At step 490, the process retrieves a copy of the program's basic (de-bloated) blocks and the metadata corresponding to the basic blocks from data store 420. A copy of the metadata is stored in memory area 310 and a copy of the de-bloated basic blocks (code) is stored in the basic block manager's private memory area 315. At predefined process 495, the process launches the requested program (see FIG. 5 and corresponding text for processing details). The program launch routine uses the basic block metadata from memory area 310 and the basic block code data from memory area 315. FIG. 4 processing thereafter ends at 499.

Figure 5:
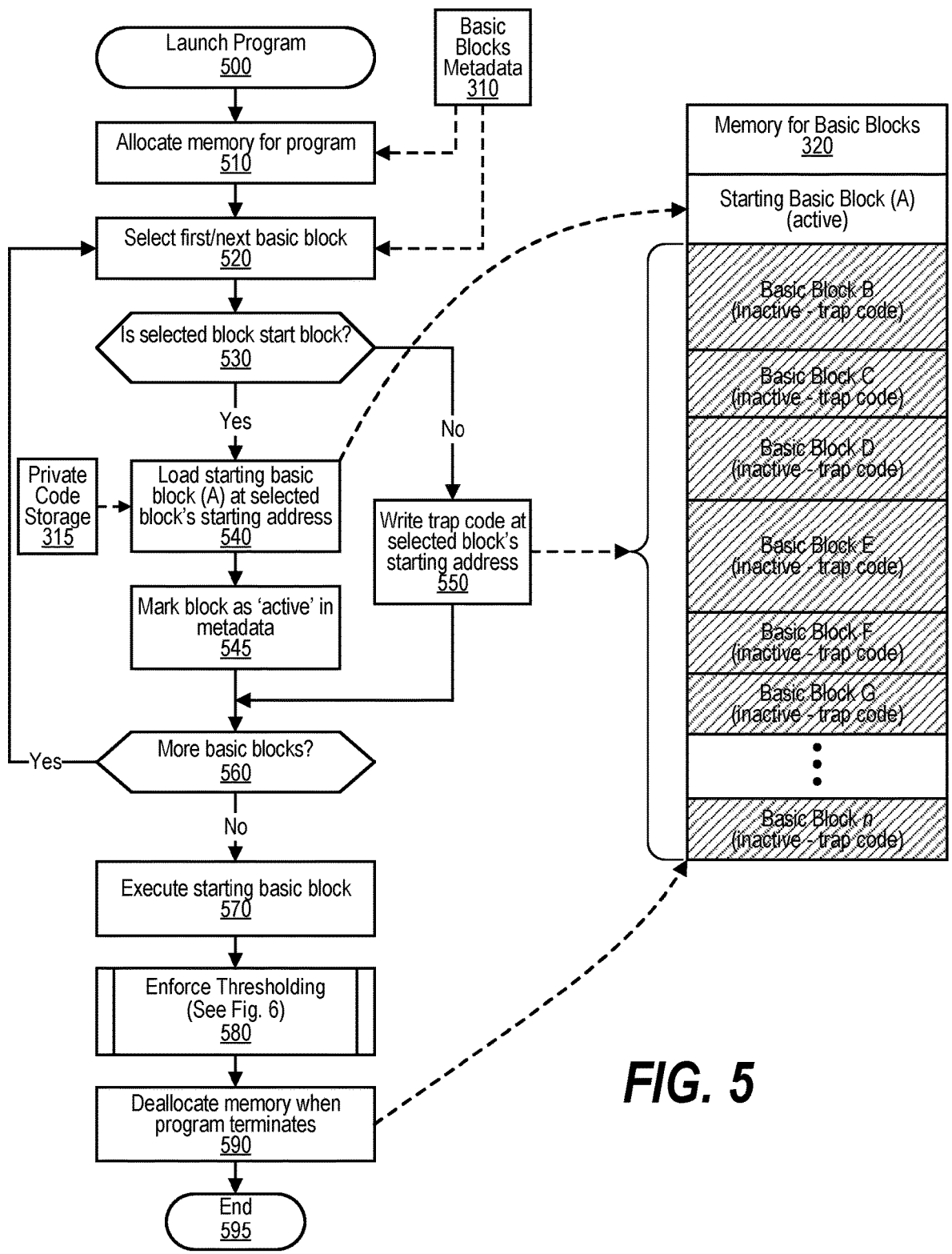
FIG. 5 is a flowchart showing steps taken by the basic block manager when it launches a program after gathering the program's metadata.

FIG. 5 is a flowchart showing steps taken by the basic block manager when it launches a program after gathering the program's metadata. FIG. 5 processing commences at 500 and shows the steps taken the basic block manager to launch a program. At step 510, the process allocates memory for program within memory area 320 where basic blocks are stored.

At step 520, the process selects the first basic block for the program being launched. The process determines as to whether the selected basic block is the starting block (decision 530). If the selected basic block is the starting block, then decision 530 branches to the 'yes' branch to perform steps 540 and 545. On the other hand, if the selected basic block is not the starting block, then decision 530 branches to the 'no' branch and performs step 550 instead.

When the selected basic block is the starting block, then steps 540 and 545 are performed. At step 540, the process loads the starting basic block (A) from the basic block manager's private memory 315 with the block being written to the selected block's starting address within memory area 320. At step 545, the process marks the starting block as 'active' in the metadata.

When the selected basic block is not the starting block then, at step 550, the process writes trap code at selected block's starting address. This trap code, when executed, traps back to the basic block manager to inform the manager that the block has been called and the basic block manager takes care of writing the correct code to the memory space.

The process determines whether there are more basic blocks to select and process from the program that is being launched (decision 560). If there are more basic blocks to select and process, then decision 560 branches to the 'yes' branch which loops back to step 520 to select and process the next basic block associated with the program being launched. This looping continues until all of the basic blocks associated with the program being launched have been processed, at which point decision 560 branches to the 'no' branch exiting the loop.

At step 570, the process executes the starting basic block. During execution, inactivated code might be called causing the previously mentioned "trap" code to execute which will result in the basic block manager activating the called basic block by writing the code back to the memory space assigned to the called basic block.

Figure 6:
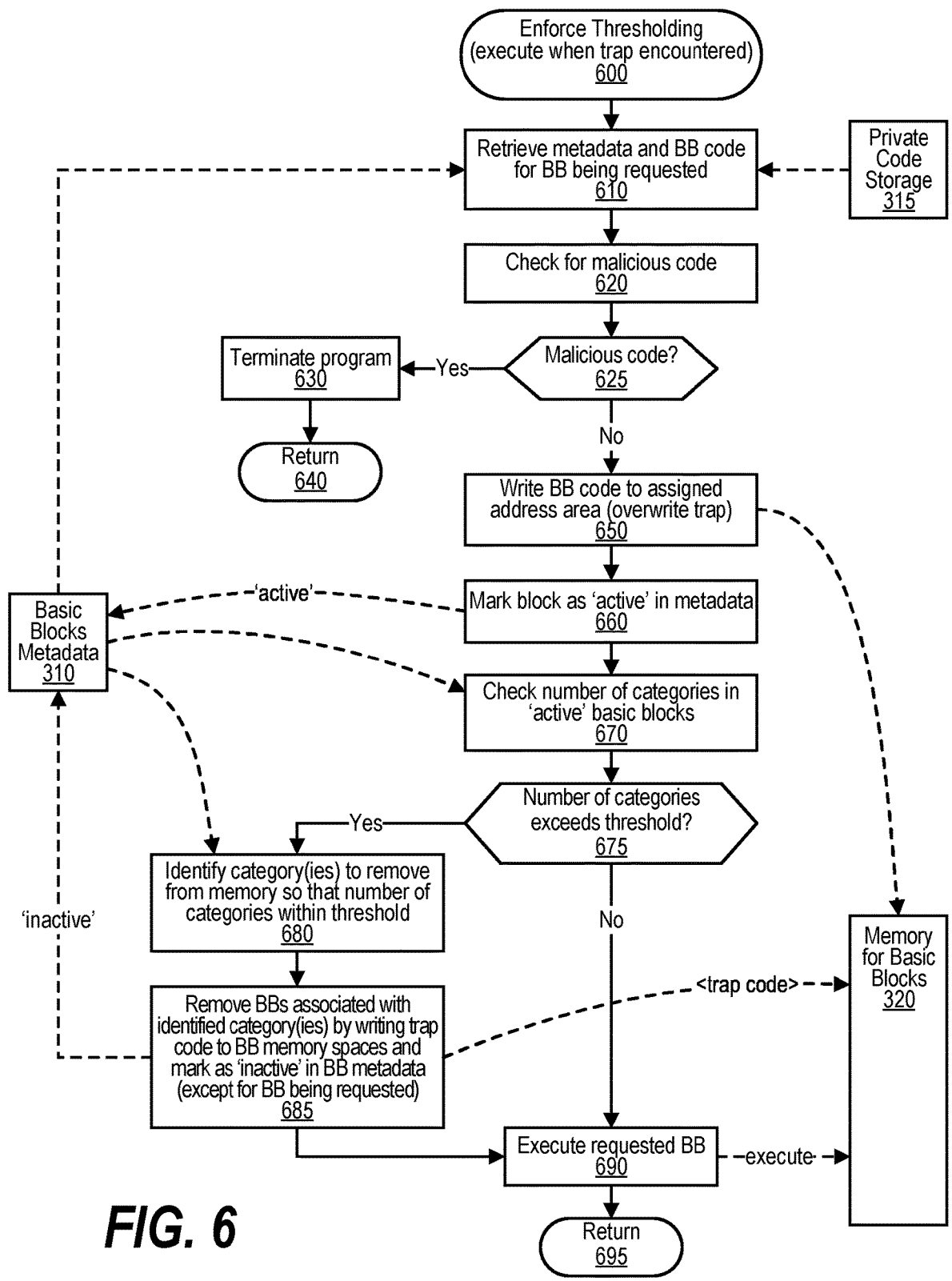
FIG. 6 is a flowchart showing steps taken by the basic block manager to enforce gadget class thresholding and remove basic blocks from memory when a threshold is exceeded.

At predefined process 580, the process performs the Enforce Thresholding routine (see FIG. 6 and corresponding text for processing details). This routine ensures that the number of "types" of programs does not exceed a given threshold. If the threshold is breached, then this routine operates to inactivate one or more basic blocks so that the number of "active" types of program instructions does not exceed the threshold. At step 590, the process deallocates memory 320 when the program terminates. FIG. 5 processing thereafter ends at 595.

FIG. 6 is a flowchart showing steps taken by the basic block manager to enforce gadget class thresholding and remove basic blocks from memory when a threshold is exceeded. FIG. 6 processing commences at 600 and shows the steps taken by the basic block manager to enforce thresholding whenever a trap is encountered. As previously mentioned, a trap is encountered when an actively running basic block makes a call to a basic block that has been inactivated with the code at the inactivated block being trap code that calls the basic block manager so that the basic block manager can load the code into the memory space of the requested basic block and then execute the basic block.

At step 610, the process retrieves the metadata and the basic block code for the basic block that is being requested. The code for the basic block was previously stored in memory area 315 and step 610 retrieves the code from the memory area. At step 620, the process checks for malicious code using traditional means and techniques. The process determines whether the requested basic block includes malicious code (decision 625). If malicious code is found, then decision 625 branches to the 'yes' branch whereupon, at step 630, the program is terminated and processing ends at 640. On the other hand, if malicious code is not detected, then decision 625 branches to the 'no' branch for further processing At step 650, the process writes the basic block code to the assigned memory address area in memory area 320 that is used for running basic blocks with the writing overwriting the trap code that was previously found at the starting address location of the requested basic block. At step 660, the process marks block as 'active' in the metadata which is stored in memory area 310. At step 670, the process checks the number of program types (e.g., gadget classes, types, categories, etc.) in the 'active' basic blocks that are currently available in memory area 320. The number of active basic blocks is found by checking the metadata of basic blocks in memory area 310 with the metadata indicating the type of code corresponding to each of the active basic blocks.

The process determines as to whether the number of types of code in the active basic blocks exceeds a given threshold (decision 675). If the number of types of code in the active basic blocks exceeds the threshold, then decision 675 branches to the 'yes' branch to perform steps 680 and 685 that operate to remove code from some basic blocks so that the threshold is no longer exceeded. On the other hand, if the number of types of code in the active basic blocks does not exceed the threshold, then decision 675 branches to the 'no' branch bypassing steps 680 and 685.

Steps 680 and 685 are performed when the number of types of code in the active basic blocks exceeds the threshold. At step 680, the process identifies one or more types of code to remove from memory area 320 so that the number of types of code found in memory area 320 is within the allowed threshold. At step 685, the process removes the basic blocks associated with identified types of code by writing trap code to the memory spaces of the basic blocks being inactivated and further marks each of these basic blocks as being 'inactive' in basic block metadata 310. An exception is made for the basic block that is currently being requested with this basic block being allowed to remain in memory area 320 if the type of code found in this basic block was somehow selected for removal during step 680.

At step 690, the process executes the requested basic block. FIG. 6 processing thereafter returns to the calling routine (see FIG. 5) at 695.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor and a memory accessible by the processor, the method comprising:
   receiving a request to execute a computer program;
   determining an active set of metadata that corresponds to the requested computer program;
   loading one or more basic blocks of the requested computer program in the memory, wherein one of the loaded basic blocks is a starting block of the requested computer program, and wherein the memory also includes one or more basic blocks corresponding to one or more previously loaded computer programs;

inactivating one or more basic blocks that are stored in the memory, wherein the inactivated basic blocks are identified based on comparing the active set of metadata to sets of metadata corresponding to the basic blocks of the previously loaded computer programs; and executing the starting block of the requested computer program.

2. The method of claim 1 further comprising:

identifying a functional category of each of the basic blocks, wherein the functional category is one of the metadata and used in comparing the active set of metadata corresponding to the starting block with the metadata corresponding to the basic blocks of the previously loaded computer programs.

3. The method of claim 1 further comprising:

identifying a number of categories included in one or more active basic blocks that are stored in the memory; and comparing the number of categories to a threshold, wherein the inactivation of the one or more basic blocks is performed in response to the number of categories exceeding the threshold.

4. The method of claim 1 further comprising:

inactivating a selected one of the one or more basic blocks by writing a trap instruction to a selected memory area in the memory where the selected basic block is stored whereupon, when executed, the trap instruction calls a procedure that reloads a set of code instructions associated with the selected basic block back to the selected memory area with the reloading overwriting the trap instruction.

5. The method of claim 4 further comprising:

writing the set of code instructions associated with the selected basic block from the selected memory area to a private memory area prior to writing the trap instruction, wherein the reloading comprises retrieving the set of instructions from the private memory area and writing the set of instructions back to the selected memory area.

6. The method of claim 1 further comprising:

storing the metadata in a database on a nonvolatile data store.

7. The method of claim 6 further comprising:

in response to data corresponding to the requested computer program already being in the nonvolatile data store prior to the loading, retrieving debloated versions of the basic blocks of the requested computer program and the active set of metadata from the nonvolatile data store; and in response to the data corresponding to the requested computer program being absent from the nonvolatile data store prior to the loading:
debloating the one or more basic blocks of the requested computer program;
storing a debloated version of the basic blocks in the nonvolatile data store; and
storing the active set of metadata in the nonvolatile data store.

8. An information handling system comprising:
one or more processors;
a memory coupled to at least one of the processors;
a set of computer program instructions stored in the memory and executed by at least one of the processors in order to perform actions comprising:
receiving a request to execute a computer program;
determining an active set of metadata that corresponds to the requested computer program;
loading one or more basic blocks of the requested computer program in the memory, wherein one of the loaded basic blocks is a starting block of the requested computer program, and wherein the memory also includes one or more basic blocks corresponding to one or more previously loaded computer programs;
inactivating one or more basic blocks that are stored in the memory, wherein the inactivated basic blocks are identified based on comparing the active set of metadata to sets of metadata corresponding to the basic blocks of the previously loaded computer programs; and
executing the starting block of the requested computer program.

9. The information handling system of claim 8 wherein the actions further comprise:

identifying a functional category of each of the basic blocks, wherein the functional category is one of the metadata and used in comparing the active set of metadata corresponding to the starting block with the metadata corresponding to the basic blocks of the previously loaded computer programs.

10. The information handling system of claim 8 wherein the actions further comprise:

identifying a number of categories included in one or more active basic blocks that are stored in the memory; and comparing the number of categories to a threshold, wherein the inactivation of the one or more basic blocks is performed in response to the number of categories exceeding the threshold.

11. The information handling system of claim 8 wherein the actions further comprise:

inactivating a selected one of the one or more basic blocks by writing a trap instruction to a selected memory area in the memory where the selected basic block is stored whereupon, when executed, the trap instruction calls a procedure that reloads a set of code instructions associated with the selected basic block back to the selected memory area with the reloading overwriting the trap instruction.

12. The information handling system of claim 11 wherein the actions further comprise:

writing the set of code instructions associated with the selected basic block from the selected memory area to a private memory area prior to writing the trap instruction, wherein the reloading comprises retrieving the set of instructions from the private memory area and writing the set of instructions back to the selected memory area.

13. The information handling system of claim 8 wherein the actions further comprise:

storing the metadata in a database on a nonvolatile data store.

14. The information handling system of claim 13 wherein the actions further comprise:

in response to data corresponding to the requested computer program already being in the nonvolatile data store prior to the loading, retrieving debloated versions of the basic blocks of the requested computer program and the active set of metadata from the nonvolatile data store; and in response to the data corresponding to the requested computer program being absent from the nonvolatile data store prior to the loading:
  debloating the one or more basic blocks of the requested computer program;
  storing a debloated version of the basic blocks in the nonvolatile data store; and
  storing the active set of metadata in the nonvolatile data store.

15. A computer program product comprising:
a computer readable storage medium, comprising computer program code that, when executed by an information handling system, executes instructions that perform actions comprising:
receiving a request to execute a computer program;
determining an active set of metadata that corresponds to the requested computer program;
loading one or more basic blocks of the requested computer program in the memory, wherein one of the loaded basic blocks is a starting block of the requested computer program, and wherein the memory also includes one or more basic blocks corresponding to one or more previously loaded computer programs;
inactivating one or more basic blocks that are stored in the memory, wherein the inactivated basic blocks are identified based on comparing the active set of metadata to sets of metadata corresponding to the basic blocks of the previously loaded computer programs; and
executing the starting block of the requested computer program.

16. The computer program product of claim 8 wherein the actions further comprise:
  identifying a functional category of each of the basic blocks, wherein the functional category is one of the metadata and used in comparing the active set of metadata corresponding to the starting block with the metadata corresponding to the basic blocks of the previously loaded computer programs.

17. The computer program product of claim 15 wherein the actions further comprise:
  identifying a number of categories included in one or more active basic blocks that are stored in the memory; and
  comparing the number of categories to a threshold, wherein the inactivation of the one or more basic blocks is performed in response to the number of categories exceeding the threshold.

18. The computer program product of claim 8 wherein the actions further comprise:
  inactivating a selected one of the one or more basic blocks by writing a trap instruction to a selected memory area in the memory where the selected basic block is stored whereupon, when executed, the trap instruction calls a procedure that reloads a set of code instructions associated with the selected basic block back to the selected memory area with the reloading overwriting the trap instruction.

19. The computer program product of claim 18 wherein the actions further comprise:
  writing the set of code instructions associated with the selected basic block from the selected memory area to a private memory area prior to writing the trap instruction, wherein the reloading comprises retrieving the set of instructions from the private memory area and writing the set of instructions back to the selected memory area.

20. The computer program product of claim 19 wherein the actions further comprise:
  in response to data corresponding to the requested computer program already being in a nonvolatile data store prior to the loading, retrieving debloated versions of the basic blocks of the requested computer program and the active set of metadata from the nonvolatile data store; and
  in response to the data corresponding to the requested computer program being absent from the nonvolatile data store prior to the loading:
    debloating the one or more basic blocks of the requested computer program;
    storing a debloated version of the basic blocks in the nonvolatile data store; and
    storing the active set of metadata in the nonvolatile data store.

* * * * *